United States Patent
Vidyadhara et al.

(10) Patent No.: US 11,294,691 B2
(45) Date of Patent: Apr. 5, 2022

(54) DYNAMIC MEMORY LAYOUTS FOR FIRMWARE UPDATES BASED ON OEM MEMORY SUBSYSTEM

(71) Applicant: Dell Products L.P., Round Rock, TX (US)

(72) Inventors: Sumanth Vidyadhara, Bangalore (IN); Karunakar Poosapalli, Telangana (IN)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 16/780,287

(22) Filed: Feb. 3, 2020

(65) Prior Publication Data

US 2021/0240487 A1 Aug. 5, 2021

(51) Int. Cl.
G06F 9/00 (2006.01)
G06F 9/4401 (2018.01)
G06F 9/50 (2006.01)
G06F 12/06 (2006.01)
G06F 12/02 (2006.01)
G06F 8/65 (2018.01)

(52) U.S. Cl.
CPC ............ *G06F 9/4406* (2013.01); *G06F 8/65* (2013.01); *G06F 9/5016* (2013.01); *G06F 12/0246* (2013.01); *G06F 12/06* (2013.01); *G06F 9/4401* (2013.01)

(58) Field of Classification Search
CPC ...... G06F 9/4406; G06F 9/5016; G06F 12/06; G06F 12/0246; G06F 8/65
USPC ......................................................... 713/2
See application file for complete search history.

(56) References Cited

U.S. PATENT DOCUMENTS

| | | | | |
|---|---|---|---|---|
| 2004/0162973 | A1* | 8/2004 | Rothman | G06F 8/60 713/1 |
| 2005/0144609 | A1* | 6/2005 | Rothman | G06F 11/1433 717/168 |
| 2006/0031664 | A1* | 2/2006 | Wilson | H04L 67/34 713/1 |
| 2009/0006834 | A1* | 1/2009 | Rothman | G06F 8/65 713/2 |
| 2009/0327679 | A1* | 12/2009 | Huang | G06F 9/4406 713/2 |
| 2009/0327684 | A1* | 12/2009 | Zimmer | G06F 21/575 713/2 |
| 2010/0082932 | A1* | 4/2010 | Rothman | G06F 9/44505 711/166 |

(Continued)

*Primary Examiner* — Volvick Derose
(74) *Attorney, Agent, or Firm* — Kirton McConkie; Brian Tucker

(57) ABSTRACT

A capsule-based firmware update process is provided. After an operating system has provided a firmware update in the form of a capsule and the computing system is rebooted, a module can be loaded to locate a memory subsystem separate from the system memory. The module can initialize the separate memory subsystem and then identify a contiguous block of memory within the separate memory subsystem. The module can then cause the capsule to be coalesced from the system memory into the separate memory subsystem. Once the capsule is coalesced into the separate memory subsystem and the system memory is registered, the module can cause the coalesced capsule to be copied back into system memory where it can be accessed by other components that are subsequently loaded during the boot process.

18 Claims, 8 Drawing Sheets

(56) References Cited

U.S. PATENT DOCUMENTS

| | | | |
|---|---|---|---|
| 2014/0007069 A1* | 1/2014 | Cavalaris | G06F 8/654 |
| | | | 717/170 |
| 2016/0170736 A1* | 6/2016 | Landry | G06F 11/1433 |
| | | | 717/168 |
| 2016/0179500 A1* | 6/2016 | Hsieh | G06F 11/1433 |
| | | | 713/2 |
| 2016/0202964 A1* | 7/2016 | Butcher | G06F 8/65 |
| | | | 717/172 |
| 2016/0231804 A1* | 8/2016 | Bulusu | G06F 9/4401 |
| 2016/0246510 A1* | 8/2016 | Rothman | G06F 9/44505 |
| 2017/0242686 A1* | 8/2017 | Vidyadhara | G06F 8/656 |
| 2017/0286086 A1* | 10/2017 | Narasimhan | G06F 8/654 |
| 2017/0357500 A1* | 12/2017 | Vidyadhara | G06F 13/24 |
| 2019/0095623 A1* | 3/2019 | Narasimhan | G06F 21/44 |
| 2019/0243634 A1* | 8/2019 | Lewis | G06F 1/24 |
| 2019/0243637 A1* | 8/2019 | Nachimuthu | G06F 3/0614 |
| 2020/0272738 A1* | 8/2020 | Shroff | G06F 8/65 |

* cited by examiner

DYNAMIC MEMORY LAYOUTS FOR FIRMWARE UPDATES BASED ON OEM MEMORY SUBSYSTEM

CROSS-REFERENCE TO RELATED APPLICATIONS

N/A

BACKGROUND

The Unified Extensible Firmware Interface (UEFI) is an interface between an operating system and firmware on a computing system. The UEFI defines a mechanism for enabling the operating system to initiate a firmware update. In UEFI-based systems, an operating system can deliver a firmware update to the firmware in the form of a capsule such as by invoking the UpdateCapsule runtime service. This capsule, which includes the firmware image as its payload, is stored in a contiguous virtual address space. However, the capsule will be spread across a discontinuous set of physical address ranges in system memory. For this reason, when the operating system delivers the capsule to the UpdateCapsule runtime service, it will provide a "scatter gather list" which defines the physical address ranges where the capsule fragments are stored.

The operating system can specify whether the capsule should be processed immediately or after reboot (e.g., using a flag in the capsule's header). When the capsule is to be processed after reboot, the UpdateCapsule runtime service will set appropriate variables to ensure that, after the system is reset, the UEFI pre-boot environment will detect that the capsule is stored in system memory and cause the capsule to be processed.

The UEFI boot sequence includes three phases: a security (SEC) phase, a pre-EFI initialization (PEI) phase and a driver execution environment (DXE) phase. During the PEI phase, the memory reference code (MRC) will be executed to initialize the system memory (e.g., DRAM). When the operating system has delivered a capsule, and after the system memory that includes the capsule is initialized, a platform PEI module will coalesce the capsule into a contiguous block of the system memory and then register the system memory while excluding the block that contains the coalesced capsule. The platform PEI module can then copy the coalesced capsule into the registered system memory and create a capsule hand-off block (HOB) that describes where the capsule is stored. The capsule HOB will be detected during the DXE phase to thereby allow the capsule to be located and processed to install the firmware update.

This process of handling capsules has various drawbacks. For example, before the capsule fragments can be coalesced, the MRC must initialize the system memory to allow the capsule fragments to be coalesced in a contiguous block in the system memory. Then, once the capsule is coalesced, there is a possibility that the block containing the coalesced capsule could become corrupted or unavailable by the time the DXE phase components attempt to process the capsule to install the firmware update. Additionally, non-UEFI computing systems do not support this capsule-based firmware update process (e.g., Coreboot computing systems such as Chromebooks).

BRIEF SUMMARY

The present invention extends to methods, systems, and computer program products for performing a capsule-based firmware update process. After an operating system has provided a firmware update in the form of a capsule and the computing system is rebooted, a module can be loaded to locate a memory subsystem separate from the system memory. The module can initialize the separate memory subsystem and then identify a contiguous block of memory within the separate memory subsystem. The module can then cause the capsule to be coalesced from the system memory into the separate memory subsystem. Once the capsule is coalesced into the separate memory subsystem and the system memory is registered, the module can cause the coalesced capsule to be copied back into system memory where it can be accessed by other components that are subsequently loaded during the boot process.

In some embodiments, the present invention is implemented on a computing system as a method for providing a firmware update in the form of a capsule. During a boot process on the computing system, a module can detect that a capsule containing a firmware update exists in system memory. In response to the detection, the module can identify a block of memory in a separate memory subsystem that is available on the computing system. The module can then cause the capsule to be coalesced from the system memory into the block of memory in the separate memory subsystem.

In some embodiments, the present invention is implemented as a computing system that includes one or more processors, system memory, a separate memory subsystem, an operating system, and firmware. During a boot process, the firmware can detect that the operating system has stored a capsule containing a firmware update in the system memory. In response to the detection, the firmware can identify a block of memory in the separate memory subsystem and cause the capsule to be coalesced from the system memory into the block of memory in the separate memory subsystem.

In some embodiments, the present invention is implemented as computer storage media storing computer executable which when executed on a computing system implement a method for providing a firmware update in the form of a capsule. The method can include: during an initialization stage of a boot process, detecting that an operating system on the computing system has stored a capsule in system memory, the capsule including a firmware update; in response to the detection, determining that a first separate memory subsystem is to be employed to coalesce the capsule; identifying a block of memory in the first separate memory subsystem; causing the capsule to be coalesced from the system memory into the block of memory in the first separate memory subsystem; and after the capsule is coalesced into the block of memory in the first separate memory subsystem, causing the coalesced capsule to be copied into the system memory.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the specification and the claims, the term "separate memory subsystem" should be construed as encompassing any memory subsystem other than system memory. The term "system memory" should be construed as a computing system's RAM in which the operating system is loaded and which the operating system employs during runtime. Examples of separate memory subsystems include graphics processing unit (GPU) memory, Non-Volatile Memory Express (NVMe) based storage and dedicated internal memory. The term "computing system" should be construed as representing laptops, desktops, tablets, thin clients, mobile devices, or other similar end user computing devices that have an operating system that supports capsule-based firmware updates.

In the specification, embodiments of the present invention will be described primarily in the context of a UEFI-based computing system. In such cases, the term "capsule" can be construed in accordance with the UEFI specification. However, the present invention enables a capsule-based firmware update process to be implemented on non-UEFI-based computing systems including Coreboot computing systems and legacy bios computing systems. In such cases, the term "capsule" can be construed as a data structure that includes a firmware image which, when delivered by the operating system, is spread across a discontinuous set of physical address ranges in system memory and must therefore be coalesced before the capsule can be processed to update firmware.

Figure 1:
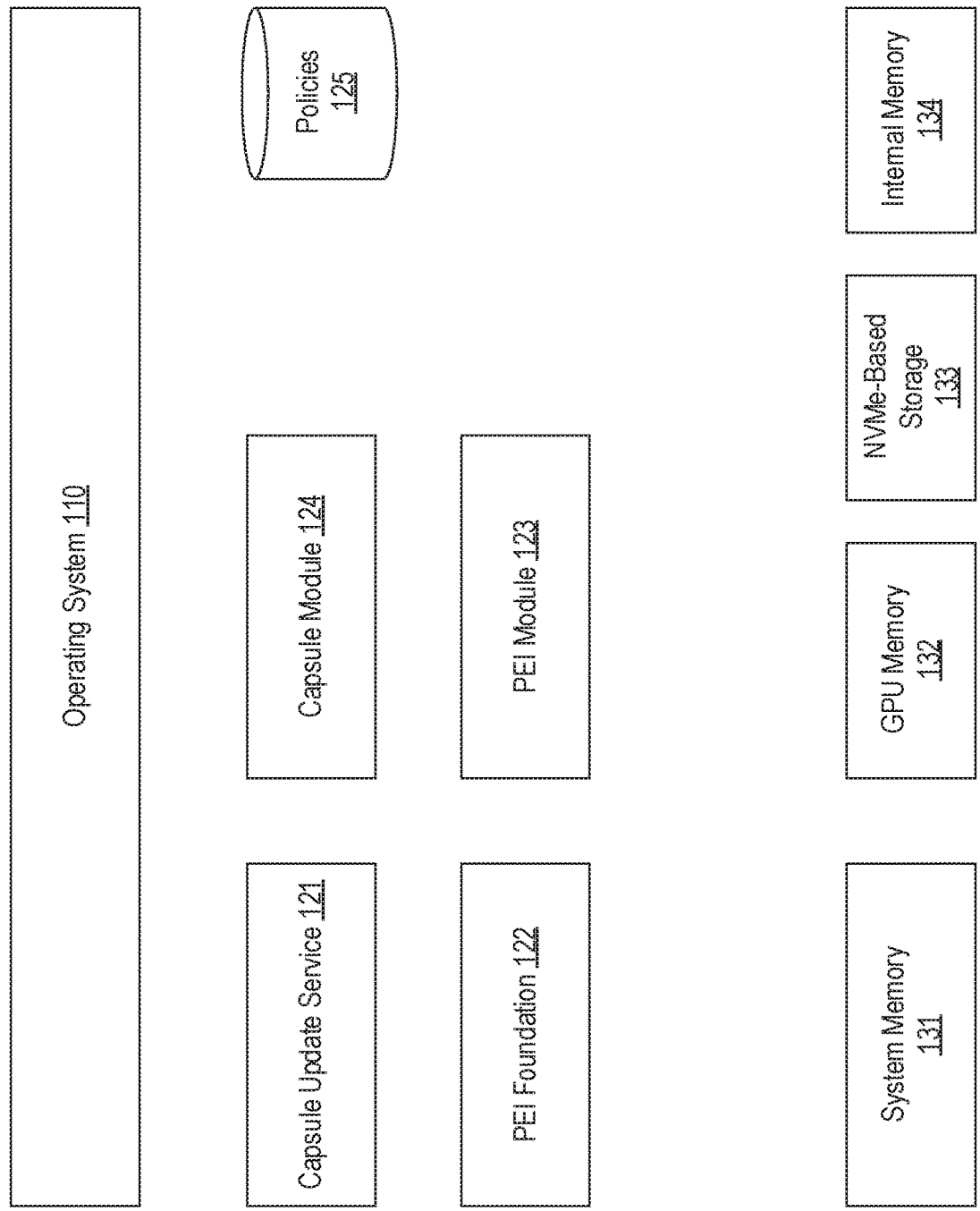
FIG. 1 illustrates an example of various components that can be employed on a computing system to implement embodiments of the present invention.

FIG. 1 illustrates a number of software and hardware components that may be included on a computing system 100 that can be used to implement embodiments of the present invention. As shown, computing system 100 includes an operating system 110 which could be a version of Windows, Linux, Unix or any other operating system that supports the delivery of firmware updates in the form of capsules. Computing system 100 is also shown as including system memory 131 and three separate memory subsystems: GPU memory 132, NVMe-based storage 133 and internal memory 134. It is noted that a computing system that implements embodiments of the present invention will include system memory and one or more separate memory subsystems. Although not shown, computing system 100 would include a CPU and various other types of hardware.

Computing system 100 also includes a number of software components including capsule update service 121, PEI foundation 122, PEI module 123 and capsule module 124. In a UEFI environment, capsule update service 121 can be a UEFI runtime service with which operating system 110 interfaces at runtime, PEI foundation 122 can represent the core components that manage the PEI phase including the loading of PEI modules (PEIMs), and PEI module 123 and capsule module 124 can both be PEIMs. However, as mentioned above, embodiments of the present invention can also be implemented in non-UEFI environments and therefore, these components should be construed in accordance with the functionality they perform. For example, capsule update service 121 can represent any software component that enables operating system 110 to notify firmware at runtime of the existence of a capsule in system memory 131. Similarly, PEI foundation 122, PEI module 123 and capsule module 124 could represent components that execute during the ROM stage in a Coreboot implementation or option ROMs in a legacy BIOS implementation. Policies 125, which is an optional component, represents any type of data structure accessible to PEI module 123 that defines which separate memory subsystem should be employed to implement the techniques of the present invention (e.g., a UEFI variable).

FIGS. 2A-2F provide an example of how a capsule-based firmware update process can be performed in accordance with embodiments of the present invention. This example will be described in the context of a UEFI-based computing system using the components depicted in FIG. 1, but the described functionality can also be performed on non-UEFI-based computing systems to enable capsule-based firmware updates. Also, this example represents a scenario where a single capsule is handled. However, the capsule-based firmware update process of the present invention could be implemented when the operating system provides any number of capsules.

Figure 2A:
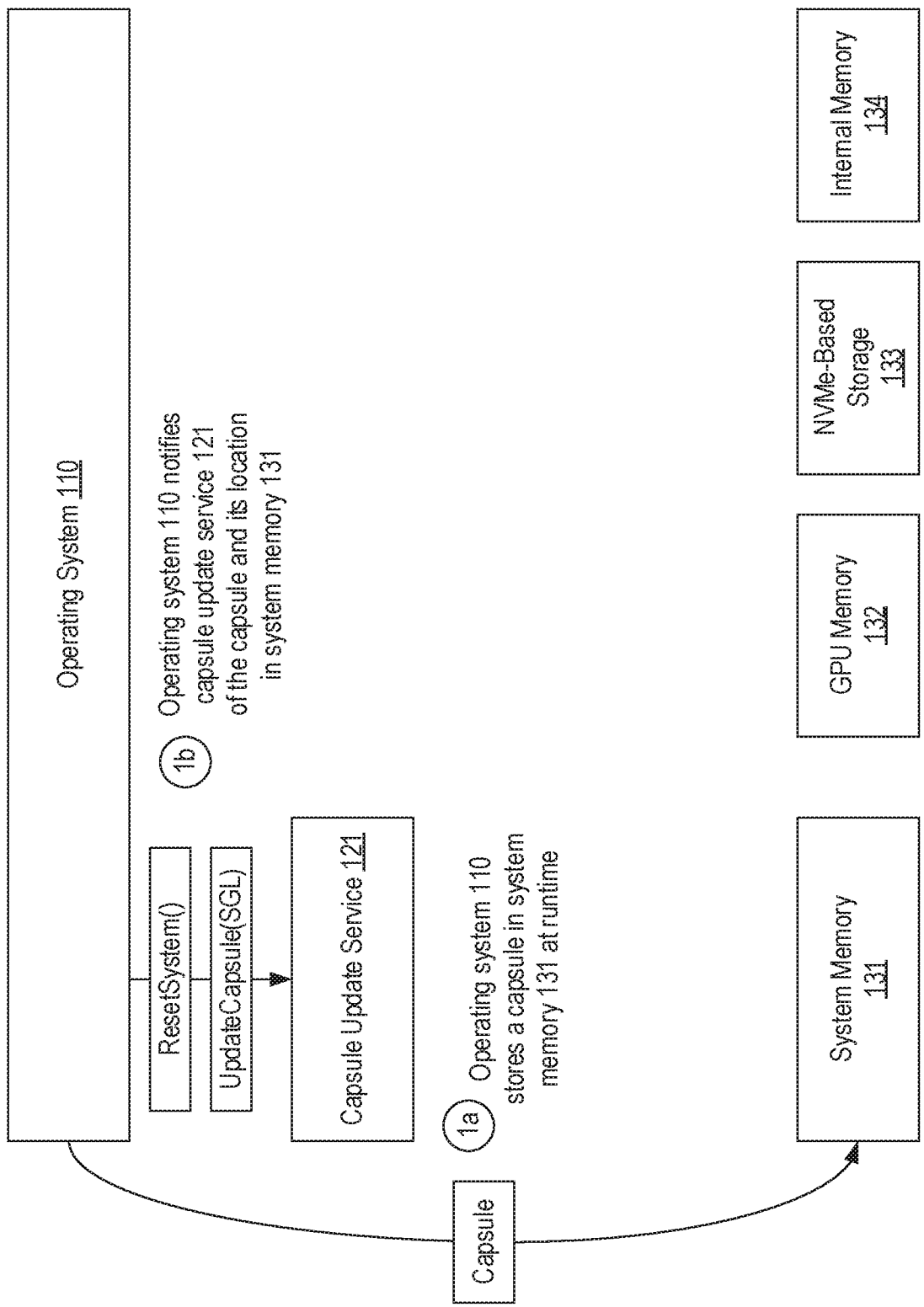
FIGS. 2A-2F illustrate an example of how a capsule-based firmware update can be performed in accordance with embodiments of the present invention.

In step 1*a* shown in FIG. 2A, operating system 110 stores a capsule in system memory 131. As described in the background, even though the capsule is stored in a continuous region of the virtual address space, the capsule will be spread across a number of discontinuous regions in system memory 131. In other words, a number of capsule fragments will exist in system memory 131. Once the capsule is stored in system memory 131, in step 1*b*, operating system 110 notifies capsule update service 121 of the capsule, specifies where it is stored in system memory 131 and then resets computing system 100. For example, in a UEFI-based implementation, capsule update service 121 may expose the UEFI UpdateCapsule function that operating system 110 can invoke to provide a scatter gather list (SGL) that identifies each region of system memory 131 that includes a capsule fragment. The term "scatter gather list" can be construed as any data structure that identifies where in system memory 131 each capsule fragment is stored. This scatter gather list can be persisted in a known location (e.g., as a UEFI variable in the motherboard's NVRAM) so that it remains available when the computing system is rebooted. In a non-UEFI-based implementation, capsule update service 121 can represent any software component that functions as an interface for operating system 110 to notify the firmware of a capsule and to provide a scatter gather list defining where the capsule is stored in system memory 131.

Figure 2B:
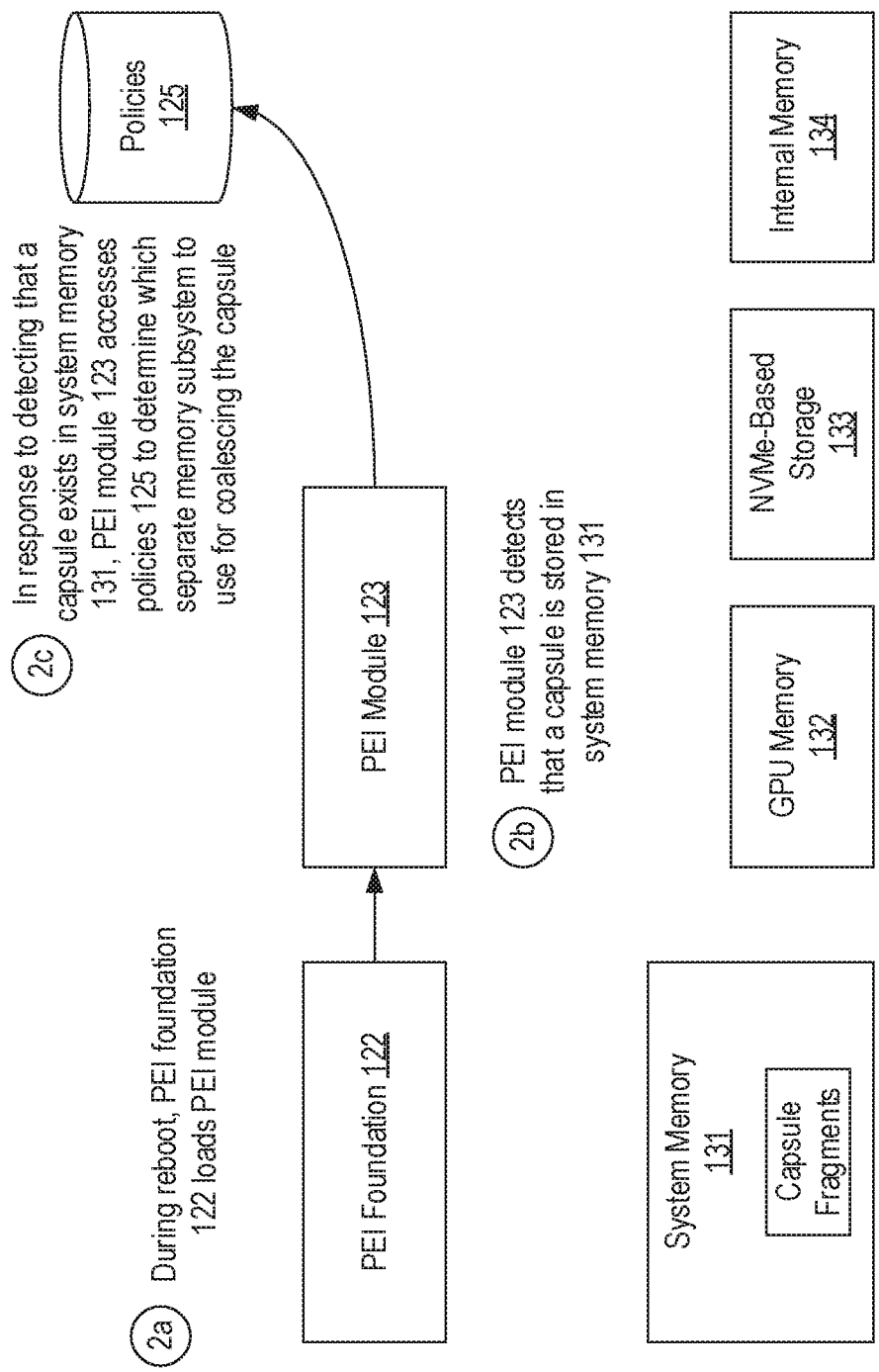

Turning to FIG. 2B, it is assumed that computing system 110 has commenced the reboot process. For example, FIG. 2B can represent the state of computing system 100 after the SEC phase has completed in a UEFI-based implementation or after the Bootblock phase has completed in Coreboot-based implementations. As represented in step 2*a*, PEI foundation 122 can load PEI module 123. Then, in step 2*b*, PEI module 123 can detect that a capsule is stored in system memory 131. For example, in UEFI-based implementations, PEI module 123 could call the CheckCapsuleUpdate function which could determine whether the NVRAM stores a UEFI variable that defines a scatter gather list (e.g., in the form of a list of EFI_CAPSULE_BLOCK_DESCRIPTOR entries). In response to detecting that a capsule exists in system memory 131, in step 2c, PEI module 123 can access policies 125 to determine which of the separate memory subsystems on computing system 100 should be used to coalesce the capsule that is stored in system memory 131. As indicated above, this step may be optional in some embodiments such as when computing system 100 includes a single separate memory subsystem or when a single separate memory subsystem will always be used. However, in embodiments where computing system 100 includes multiple separate memory subsystems that may be used to coalesce the capsule, policies 125 can specify any number of criteria for determining which separate memory subsystem should be used.

Figure 2C:
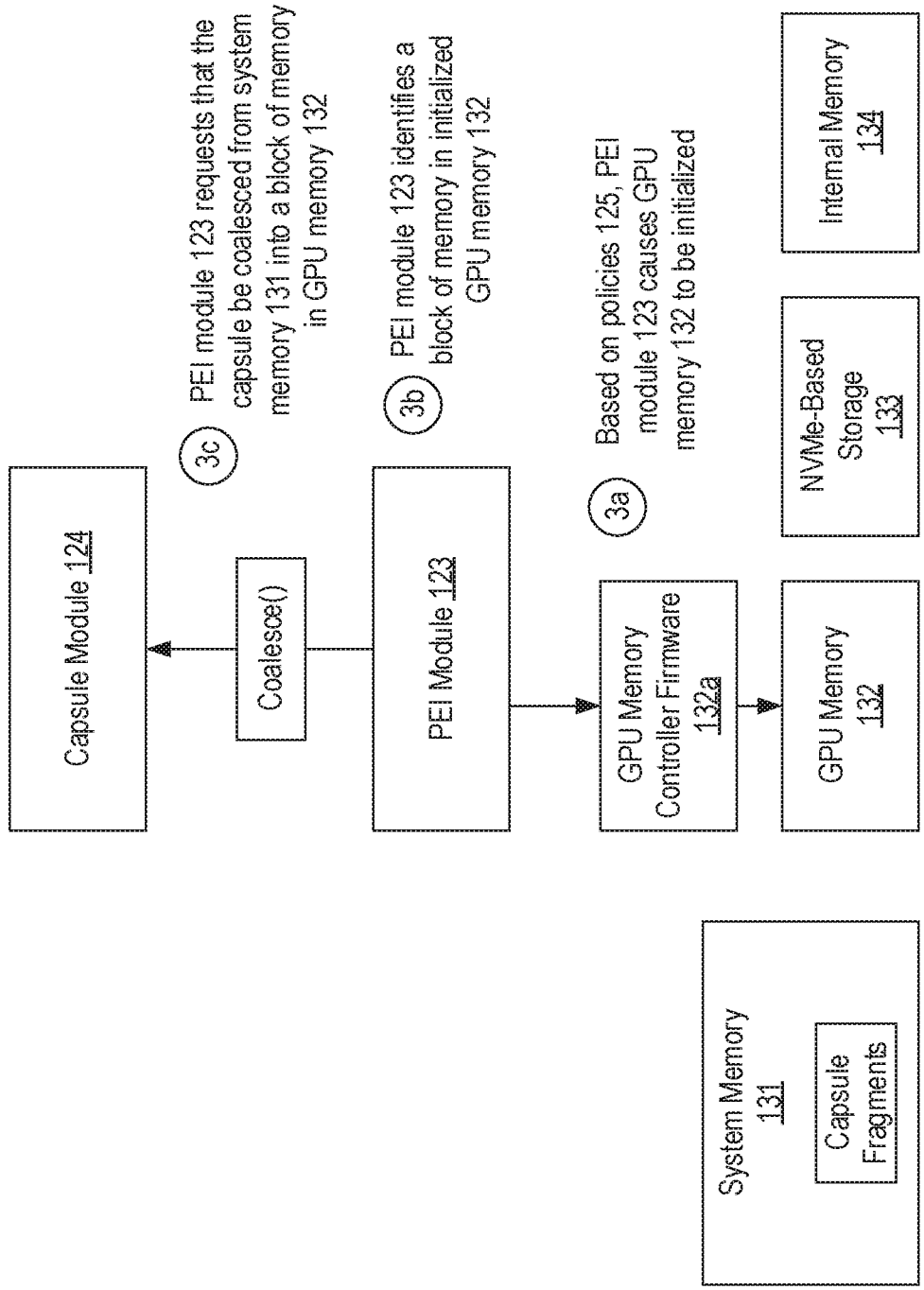

Turning to FIG. 2C, in this example, it is assumed that polices 125 dictate that GPU memory 132 should be used to coalesce the capsule. Accordingly, in step 3a, PEI module 123 can cause GPU memory 132 to be initialized such as by invoking GPU memory controller firmware 132a. Once GPU memory 132 is initialized, in step 3b, PEI module 123 can evaluate GPU memory 132 to identify a block of memory within GPU memory 132 that can be used to coalesce the capsule. For example, as part of initializing GPU memory 132, GPU memory controller firmware 132a may report each region of GPU memory 132 in the form of a resource description hand-off block (HOB) which PEI module 123 could evaluate to locate the block of memory to be used. Then, in step 3c, PEI module 123 can request that the capsule be coalesced from system memory 131 into the block of memory in GPU memory 132. For example, PEI module 123 could employ a PEIM-to-PEIM interface (PPI) to invoke the coalesce service that capsule module 124 provides and specify that the block of memory in GPU memory 132 should be used. Although not shown, prior to step 3c, PEI module 123 may invoke the memory reference code (MRC) for system memory 131 to cause system memory 131 to be initialized.

Figure 2D:
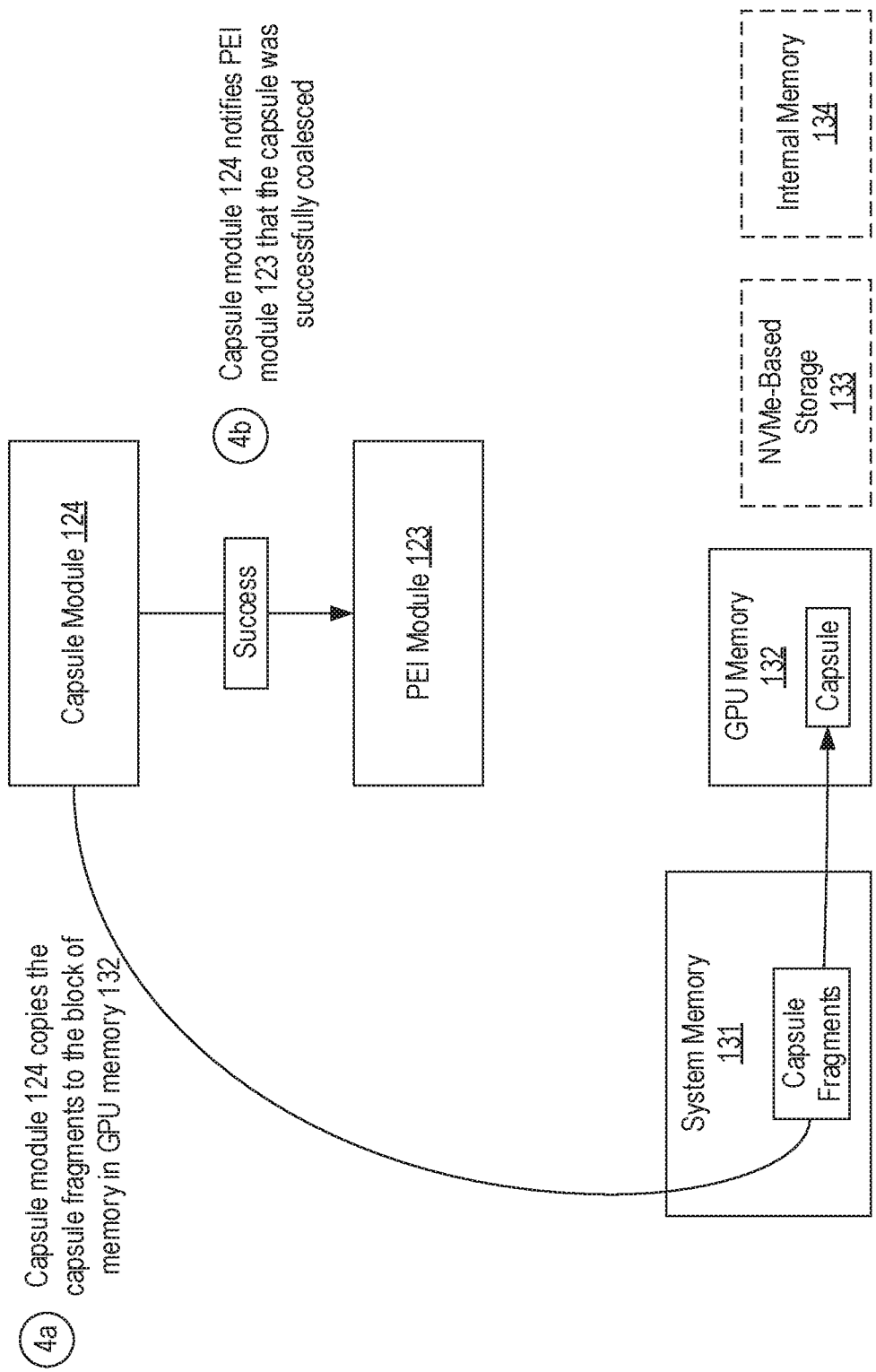

Turning to FIG. 2D, when capsule module 124's coalesce service is invoked, in step 4a, it can employ the scatter gather list to locate the various capsule fragments that are stored in system memory 131 and copy them in order into the block of GPU memory 132 that PEI module 123 specified. Then, in step 4b, capsule module 124 can notify PEI module 123 that the capsule was successfully coalesced into the specified block in GPU memory 132 (e.g., by returning EFI_SUCCESS as the status code for the coalesce function).

Figure 2E:
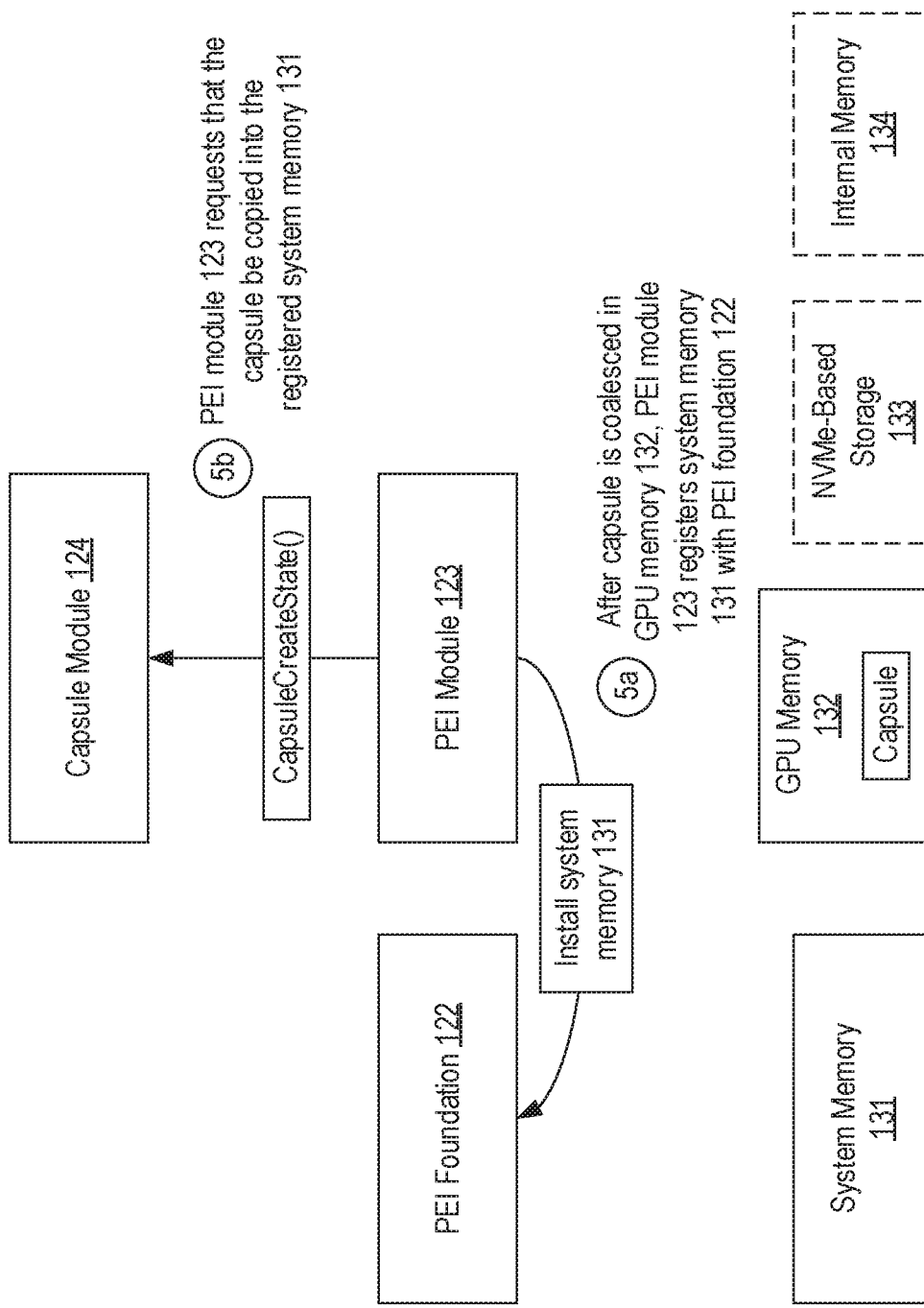

Turning to FIG. 2E, now that the capsule fragments have been copied from system memory 131, in step 5a, PEI module 123 can register system memory 131 with PEI foundation 122. For example, PEI module 123 could invoke the InstallPeiMemory function. With system memory 131 registered, in step 5b, PEI module 123 can request that the capsule that has been coalesced into GPU memory 132 be copied in system memory 131. For example, PEI module 123 could invoke the CapsuleCreateState function and specify a starting address where the coalesced capsule is stored in GPU memory 132 and a size of the coalesced capsule.

Figure 2F:
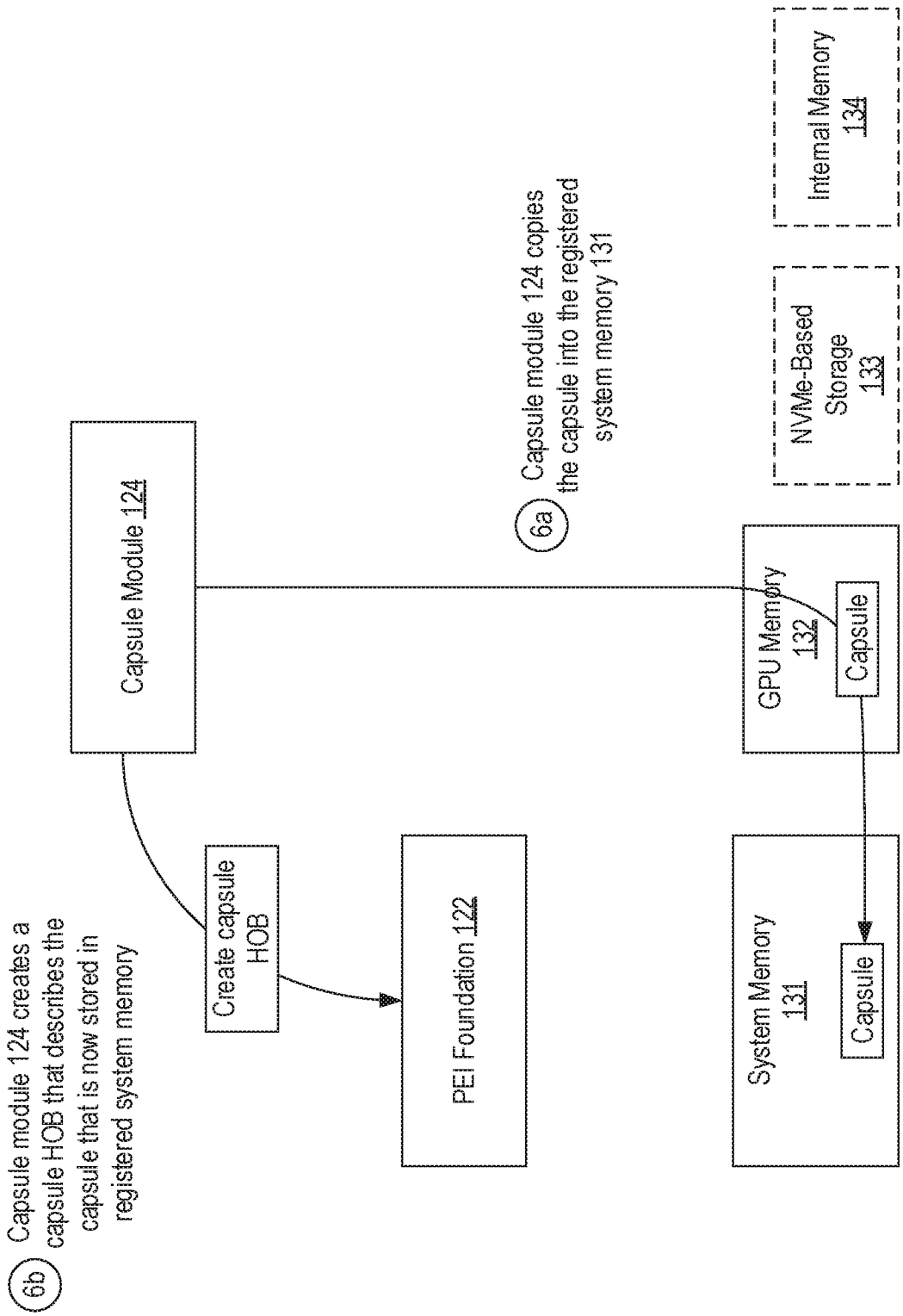

Turning to FIG. 2F, in step 6a, capsule module 124 copies the coalesced capsule from GPU memory 132 into a portion of system memory 131 that PEI module 123 registered with PEI foundation 122. Then, in step 6b, capsule module 124 creates a capsule HOB that describes the coalesced capsule that is now stored in registered system memory 131. This capsule HOB can identify the block of memory in system memory 131 (e.g., using a base address and length) and indicate that the block of memory stores a capsule. Accordingly, when the boot process proceeds to the UEFI DXE phase, Coreboot RAM stage or similar legacy BIOS stage, the capsule HOB will be detected and cause the DXE phase/RAM stage components to process the capsule to thereby install the firmware update that it contains.

To summarize, the capsule-based firmware update process of the present invention enables a capsule to be coalesced into a memory subsystem separate from system memory and then copied back into system memory during an initialization stage of the boot process so that the capsule can be processed to install the firmware update at a subsequent stage. On UEFI-based computing systems, this process can minimize or eliminate complications during the firmware update process due to corruption or unavailability of system memory. Additionally, this process enables firmware updates to be delivered in the form of capsules on non-UEFI-based computing systems.

Figure 3:
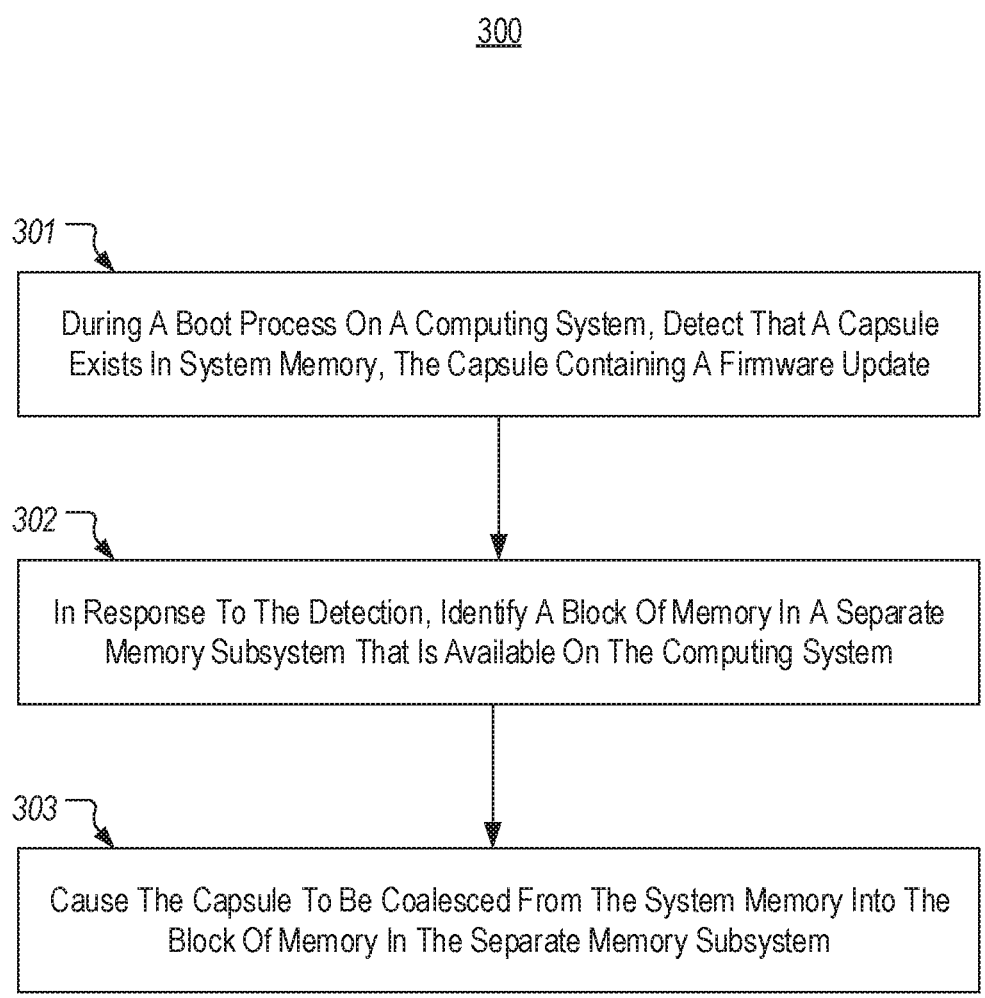
FIG. 3 provides a flowchart of an example method for providing a firmware update in the form of a capsule.

FIG. 3 provides a flowchart of an example method 300 for providing a firmware update in the form of a capsule. Method 300 can be implemented by PEI module 123 in a UEFI environment or a similar module/software component in non-UEFI environments.

Method 300 includes an act 301 of, during a boot process on a computing system, detecting that a capsule that contains a firmware update exists in system memory. For example, PEI module 123 could determine whether a scatter gather list is defined in a variable employed in the boot environment.

Method 300 includes an act 302 of, in response to the detection, identifying a block of memory in a separate memory subsystem that is available on the computing system. For example, PEI module 123 could identify a block of memory in GPU memory 132, NVMe-based storage 133 or dedicated internal memory 134.

Method 300 includes an act 303 of causing the capsule to be coalesced from the system memory into the block of memory in the separate memory subsystem. For example, PEI module 123 could specify a block of memory in GPU memory 132, NVMe-based storage 133 or dedicated internal memory 134 in a request to coalesce the capsule.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented on a computing system, for providing a firmware update in the form of a capsule, the method comprising:
   during a boot process on a computing system, detecting that a capsule exists in system memory, the capsule containing a firmware update;
   in response to the detection, selecting a first separate memory subsystem from among multiple separate memory subsystems that are available on the computing system;
   identifying a block of memory in the first separate memory subsystem;
   causing the capsule to be coalesced from the system memory into the block of memory in the first separate memory subsystem;
   causing the capsule that has been coalesced into the block of memory in the first separate memory subsystem to be copied to the system memory.

2. The method of claim 1, wherein causing the capsule to be coalesced from the system memory into the block of memory in the first separate memory subsystem comprises identifying a physical address of the block of memory.

3. The method of claim 1, further comprising:
   prior to causing the capsule to be coalesced from the system memory into the block of memory in the separate memory subsystem, initializing the first separate memory subsystem.

4. The method of claim 1, further comprising:
   prior to causing the capsule that has been coalesced into the block of memory in the first separate memory subsystem to be copied to the system memory, registering the system memory.

5. The method of claim 1, wherein causing the capsule that has been coalesced into the block of memory in the first separate memory subsystem to be copied to the system memory comprises identifying a physical address of the block of memory.

6. The method of claim 1, wherein
   the first separate memory subsystem is selected from among the multiple separate memory subsystems based on a policy.

7. The method of claim 1, wherein the separate memory subsystem is one of:
   GPU memory;
   NVMe-based storage; or
   dedicated internal memory.

8. The method of claim 1, further comprising:
   prior to causing the capsule to be coalesced from the system memory into the block of memory in the separate memory subsystem, causing the system memory to be initialized.

9. A computing system comprising:
   one or more processors;
   system memory;
   multiple separate memory subsystems;
   an operating system; and
   firmware that is configured to perform the following:
   during a boot process, detect that the operating system has stored a capsule in the system memory, the capsule containing a firmware update;
   in response to the detection, select a first separate memory subsystem from among the multiple separate memory subsystems;
   identify a block of memory in the first separate memory subsystem;
   cause the capsule to be coalesced from the system memory into the block of memory in the first separate memory subsystem; and
   cause the capsule that has been coalesced into the block of memory in the first separate memory subsystem to be copied to the system memory.

10. The computing system of claim 9, wherein the firmware comprises a pre-EFI initialization module.

11. The computing system of claim 9, further comprising:
    a policy that dictates that the block of memory in the first separate memory subsystem should be identified.

12. The computing system of claim 9, wherein the firmware causes the capsule to be coalesced from the system memory into the block of memory in the first separate memory subsystem by identifying a physical address of the block of memory.

13. The computing system of claim 9, wherein the firmware is further configured to initialize the first separate memory subsystem prior to causing the capsule to be coalesced from the system memory into the block of memory in the first separate memory subsystem.

14. The computing system of claim 9, wherein the firmware is further configured to register the system memory prior to causing the capsule that has been coalesced into the block of memory in the first separate memory subsystem to be copied to the system memory.

15. The computing system of claim 9, wherein the first separate memory subsystem is one of: GPU memory, NVMe-based storage or dedicated internal memory.

16. One or more computer storage media storing computer executable which when executed on a computing system implement a method for providing a firmware update in the form of a capsule, the method comprising:
- during an initialization stage of a boot process, detecting that an operating system on the computing system has stored a capsule in system memory, the capsule including a firmware update;
- in response to the detection, selecting a first separate memory subsystem, from among multiple separate memory subsystems, to be employed to coalesce the capsule;
- identifying a block of memory in the first separate memory subsystem;
- causing the capsule to be coalesced from the system memory into the block of memory in the first separate memory subsystem; and
- after the capsule is coalesced into the block of memory in the first separate memory subsystem, causing the coalesced capsule to be copied into the system memory.

17. The computer storage media of claim 16, wherein determining that the first separate memory subsystem is to be employed to coalesce the capsule comprises selecting the first separate memory subsystem from among multiple separate memory subsystems based on a policy.

18. The computer storage media of claim 16, wherein the method further comprises:
- after the capsule is coalesced into the block of memory in the first separate memory subsystem and prior to causing the coalesced capsule to be copied into the system memory, registering the system memory.

* * * * *